(12) United States Patent
Ng et al.

(10) Patent No.: US 8,754,925 B2
(45) Date of Patent: Jun. 17, 2014

(54) AUDIO SOURCE LOCATOR AND TRACKER, A METHOD OF DIRECTING A CAMERA TO VIEW AN AUDIO SOURCE AND A VIDEO CONFERENCING TERMINAL

(75) Inventors: Hock M. Ng, Westfield, NJ (US); Edward L. Sutter, Jr., Fanwood, NJ (US); Richard M. Abbot, Belle Mead, NJ (US)

(73) Assignee: Alcatel Lucent, Paris (FR)

( * ) Notice: Subject to any disclaimer, the term of this patent is extended or adjusted under 35 U.S.C. 154(b) by 464 days.

(21) Appl. No.: 13/038,183

(22) Filed: Mar. 1, 2011

(65) Prior Publication Data

US 2012/0081504 A1  Apr. 5, 2012

Related U.S. Application Data

(60) Provisional application No. 61/388,149, filed on Sep. 30, 2010.

(51) Int. Cl.
*H04N 7/15* (2006.01)
*H04R 5/02* (2006.01)
*H04S 3/00* (2006.01)

(52) U.S. Cl.
USPC .................. 348/14.08; 348/14.05; 348/14.16; 348/61; 348/169; 348/231.4; 369/4; 381/17; 381/92; 381/310

(58) Field of Classification Search
CPC ...................................................... H04N 7/142
USPC ......... 348/14.08, 61, 169, 231.4, 14.05, 14.1, 348/14.16; 381/92, 310, 17; 369/4; 725/105
See application file for complete search history.

(56) References Cited

U.S. PATENT DOCUMENTS

| | | | |
|---|---|---|---|
| 5,355,163 A | | 10/1994 | Tomitaka |
| 5,367,506 A | * | 11/1994 | Inanaga et al. .................... 369/4 |
| 5,500,671 A | | 3/1996 | Andersson et al. |
| 5,596,645 A | * | 1/1997 | Fujimori ......................... 381/17 |
| 5,745,161 A | | 4/1998 | Ito |
| 5,786,846 A | * | 7/1998 | Hiroaki ..................... 348/14.16 |
| 5,844,599 A | | 12/1998 | Hildin |
| 5,940,118 A | * | 8/1999 | Van Schyndel ............ 348/14.05 |
| 5,963,250 A | | 10/1999 | Parker et al. |

(Continued)

FOREIGN PATENT DOCUMENTS

| | | |
|---|---|---|
| EP | 1 643 769 A1 | 1/2005 |
| WO | 9306690 A1 | 4/1993 |
| WO | 01 82626 A1 | 11/2001 |
| WO | 01 86943 A1 | 11/2001 |

OTHER PUBLICATIONS

Lance Ulanoff—I'Robot's AVA is an App-Ready Robot—5 pages—pcmag.com, Jan 6, 2011—www.pcmag.com/article2/0,2817,2375313,00.asp.

(Continued)

*Primary Examiner* — Gerald Gauthier
(74) *Attorney, Agent, or Firm* — Hitt Gaines, PC

(57) ABSTRACT

An audio locating and tracking apparatus, a method of directing a camera to view an audio source, and a video conferencing terminal are disclosed herein. In one embodiment, the apparatus includes: (1) an audio source identifier configured to locate an audio source based on multimodal sensor data from at least two different types of sensors and (2) an image selector configured to automatically direct a camera to view the audio source.

20 Claims, 5 Drawing Sheets

FIG. 1

(56) References Cited

U.S. PATENT DOCUMENTS

| | | | |
|---|---|---|---|
| 6,005,610 A * | 12/1999 | Pingali | 348/169 |
| 6,021,206 A * | 2/2000 | McGrath | 381/310 |
| 6,072,522 A * | 6/2000 | Ippolito et al. | 348/14.1 |
| 6,266,082 B1 | 7/2001 | Yonezawa et al. | |
| 6,385,352 B1 | 5/2002 | Roustaei | |
| 6,487,600 B1 | 11/2002 | Lynch | |
| 6,593,956 B1 | 7/2003 | Potts et al. | |
| 6,628,887 B1 | 9/2003 | Rhodes et al. | |
| 6,766,035 B1 | 7/2004 | Gutta | |
| 6,772,195 B1 | 8/2004 | Hatlelid et al. | |
| 7,035,418 B1 * | 4/2006 | Okuno et al. | 381/310 |
| 7,039,221 B1 | 5/2006 | Tumey et al. | |
| 7,111,045 B2 | 9/2006 | Kato et al. | |
| 7,221,386 B2 | 5/2007 | Thacher et al. | |
| 7,271,827 B2 * | 9/2007 | Nister | 348/169 |
| 7,283,788 B1 | 10/2007 | Posa et al. | |
| 7,330,607 B2 | 2/2008 | Jung et al. | |
| 7,512,883 B2 | 3/2009 | Wallick et al. | |
| 7,626,569 B2 | 12/2009 | Lanier | |
| 7,840,903 B1 | 11/2010 | Amidon et al. | |
| 7,880,739 B2 | 2/2011 | Long et al. | |
| 7,913,176 B1 | 3/2011 | Blattner et al. | |
| 7,987,309 B2 | 7/2011 | Rofougaran | |
| 7,995,090 B2 | 8/2011 | Liu et al. | |
| 8,111,282 B2 | 2/2012 | Cutler et al. | |
| 8,125,444 B2 | 2/2012 | Norager | |
| 8,150,063 B2 * | 4/2012 | Chen et al. | 381/92 |
| 8,156,184 B2 | 4/2012 | Kurata et al. | |
| 8,264,522 B2 | 9/2012 | Martin et al. | |
| 8,397,168 B2 | 3/2013 | Leacock et al. | |
| 8,411,165 B2 * | 4/2013 | Ozawa | 348/231.4 |
| 8,451,994 B2 | 5/2013 | Abuan et al. | |
| 8,547,416 B2 * | 10/2013 | Ozawa | 348/14.16 |
| 2002/0039111 A1 | 4/2002 | Gips et al. | |
| 2002/0149672 A1 | 10/2002 | Clapp et al. | |
| 2003/0081115 A1 | 5/2003 | Curry et al. | |
| 2004/0189701 A1 | 9/2004 | Badt et al. | |
| 2004/0233282 A1 | 11/2004 | Stavely et al. | |
| 2004/0257432 A1 | 12/2004 | Girish et al. | |
| 2005/0007445 A1 | 1/2005 | Foote et al. | |
| 2005/0280701 A1 | 12/2005 | Wardell | |
| 2006/0007222 A1 | 1/2006 | Uy | |
| 2006/0077252 A1 | 4/2006 | Bain et al. | |
| 2007/0002130 A1 | 1/2007 | Hartkop | |
| 2007/0075965 A1 | 4/2007 | Huppi et al. | |
| 2007/0120879 A1 | 5/2007 | Kanade et al. | |
| 2007/0263824 A1 | 11/2007 | Bangalore et al. | |
| 2007/0273839 A1 | 11/2007 | Doi et al. | |
| 2008/0012936 A1 | 1/2008 | White | |
| 2008/0086696 A1 | 4/2008 | Sri Prakash et al. | |
| 2008/0170123 A1 | 7/2008 | Albertson et al. | |
| 2008/0211915 A1 | 9/2008 | McCubbrey | |
| 2009/0041298 A1 | 2/2009 | Sandler et al. | |
| 2009/0111518 A1 | 4/2009 | Agrawal et al. | |
| 2009/0119736 A1 | 5/2009 | Perlman et al. | |
| 2009/0122572 A1 | 5/2009 | Page et al. | |
| 2009/0141147 A1 | 6/2009 | Alberts et al. | |
| 2009/0153474 A1 | 6/2009 | Quennesson | |
| 2009/0210804 A1 | 8/2009 | Kurata et al. | |
| 2009/0216501 A1 | 8/2009 | Yeow et al. | |
| 2009/0315984 A1 * | 12/2009 | Lin et al. | 348/61 |
| 2010/0073454 A1 | 3/2010 | Lovhaugen et al. | |
| 2010/0128892 A1 * | 5/2010 | Chen et al. | 381/92 |
| 2010/0188473 A1 | 7/2010 | King et al. | |
| 2010/0328423 A1 | 12/2010 | Etter | |
| 2011/0170256 A1 | 7/2011 | Lee | |
| 2011/0254914 A1 | 10/2011 | Ng | |
| 2011/0267421 A1 | 11/2011 | Sutter, Jr. | |
| 2011/0268263 A1 | 11/2011 | Jones et al. | |
| 2012/0011454 A1 | 1/2012 | Droz et al. | |
| 2012/0069218 A1 | 3/2012 | Gantman | |
| 2012/0081504 A1 * | 4/2012 | Ng et al. | 348/14.08 |
| 2012/0083314 A1 | 4/2012 | Ng et al. | |
| 2012/0204120 A1 | 8/2012 | Lefar et al. | |
| 2012/0216129 A1 | 8/2012 | Ng et al. | |
| 2013/0141573 A1 | 6/2013 | Sutter et al. | |
| 2013/0314543 A1 | 11/2013 | Sutter et al. | |

OTHER PUBLICATIONS

Travis Deyle—IRobot AVA Telepresence Robot at CES 2011—11 pages—hizook.com, Jan. 6, 2011—www.hizook.com/blog/2011/01/06/irobot-ava-telepresence-robot-ces-2011-one-step-closer-robot-app-stores.

http://www.necdisplay.com/newtechnologies/curveddisplay/.

http://www.polycom.com/products/voice/conference_solutions/microsoft_optimized_conferencing/cx5000.html.

Bolle:U.S. Appl. No. 12/238,096; "Videoconferencing Terminal and Method of Operation Thereof to Maintain Eye Contact," filed Sep. 25, 2008.

Bolle; U.S. Appl. No. 12/472,250; Videoconferencing Terminal and Method of Operation Thereof to Maintain Eye Contact, filed May 26, 2009.

Bolle et al.; U.S. Appl. No. 12/640,998;"Videoconferencing Terminal With a Persistence of Vision Display and a Method of Operation Thereof to Maintain Eye Contact," filed Dec. 17, 2009.

M. Gross et al, "blue-c: A Spatially Immersive Display and 3D Video Portal for Telepresence", project webpage: http://bluec.ethz.ch/, ACM 0730-0301/03/0700-0819, (2003) pp. 819-827.

M. Kuechler et al, "HoloPort—A Device for Simultaneous Video and Data Conferencing Featuring Gaze Awareness", In Proceedings of the 2006 IEEE Virtual Reality Conference (VR '06), (2006), pp. 81-87.

S. Iizadi et al, "Going Beyond the Display: A Surface Technology with an Electronically Switchable Diffuser", UIST '08, (Oct. 19-22, 2008), Monterey, CA, pp. 269-278.

H. Ishii et al, "ClearBoard: A Seamless Medium for Shared Drawing and Conversation with Eye Contact", CHI '92, (May 3-7, 1992), pp. 525-532.

K-H Tan et al, "ConnectBoard: A remote collaboration system that supports gaze-aware interaction and sharing", 2009 IEEE International Workshop on Multimedia Signal Processing, MMSP '09, (Oct. 5-7, 2009), 6 pages.

S. Shiwa et al, "A Large-Screen Visual Telecommunication Device Enabling Eye Contact", SID 91 Digest, ISSN0097-0966x/91/0000-327 (1991), pp. 327-328.

C. Bolle et al, "Imaging Terminal", filed Dec. 8, 2009, U.S. Appl. No. 12/633,656, 21 pages.

C. Bolle, "Videoconferencing Terminal and Method of Operation Thereof to Maintain Eye Contact", filed May 26, 2009, U.S. Appl. No. 12/472,250, 25 pages.

Rafik, David Lo., et al., "Multimodal Talker Localization in Video Conferencing Environments", Oct. 2, 2004 IEEE, p. 195-200.

Swivl Web Page, downloaded May 7, 2012; www.swivl.com, 3 pages.

Swivl Blog Post dated Dec. 28, 2010, www.swivl.com/2010/12/why-a-video-accessory/, 2 pages.

Swivl Blog Post dated Dec. 22, 2010, www.swivl.com/2010/12/live-on-indiegogo/, 2 pages.

Foreign Communication From a Related Counterpart Application, PCT Application No. PCT/US2012/066511, International Search Report dated Jun. 13, 2013, 4 pages.

Cisco Webex, "What is Webex?" https://web.archive.org/web/20110101032216/http://www.webex.com/what-is webex/index.html, downloaded Jan. 24, 2014, 2 pages.

"HP SkyRoom Version 1 (Quanity 500) Node-locked E-LTU Software (VK634AAE)—Specifications and Warranty," Hewlett Packard, http://h10010.www.1.hp.com/wwpc/us/en/sm/WFO6b/18964-18964-4020068-4020071-4020069-4020938-4026194-4026196.html?dnr=2, downloaded Jan. 24, 2014, 3 pages.

\* cited by examiner

AUDIO SOURCE LOCATOR AND TRACKER, A METHOD OF DIRECTING A CAMERA TO VIEW AN AUDIO SOURCE AND A VIDEO CONFERENCING TERMINAL

CROSS-REFERENCE TO RELATED APPLICATION

This application claims the benefit of U.S. Provisional Application Ser. No. 61/388,149, filed by Hock M. Ng on Sep. 30, 2010, entitled "TECHNIQUE FOR VIDEOCONFERENCING INCLUDING SPEAKER LOCALIZATION AND TRACKING," and incorporated herein by reference in its entirety. This application also relates to commonly assigned co-pending U.S. patent application Ser. No. 12/759,823, filed on Apr. 14, 2010, and U.S. patent application Ser. No. 12/770,991, filed on Apr. 30, 2010, both of which are incorporated herein by reference in their entirety.

TECHNICAL FIELD

This application is directed, in general, to providing images to display, such as, providing images for a videoconferencing terminal.

BACKGROUND

This section introduces aspects that may be helpful in facilitating a better understanding of the disclosure. Accordingly, the statements of this section are to be read in this light and are not to be understood as admissions about what is in the prior art or what is not in the prior art.

Communication via computer networks frequently involves far more than transmitting text. Computer networks, such as the Internet, can also be used for audio communication and visual communication. Still images and video are examples of visual data that may be transmitted over such networks.

One or more cameras may be coupled to a computing device, such as a personal computer (PC), to provide visual communication. The camera or cameras can then be used to transmit real-time visual information, such as video, over a computer network. Dual transmission can be used to allow audio transmission with the video information. Whether in one-to-one communication sessions or through videoconferencing with multiple participants, participants can communicate via audio and video in real time over a computer network (i.e., voice-video communication).

SUMMARY

One aspect provides an apparatus. In one embodiment, the apparatus includes: (1) an audio source identifier configured to locate an audio source based on multimodal sensor data from at least two different types of sensors and (2) an image selector configured to automatically direct a camera to view the audio source.

In another aspect, a method of directing a camera to view an audio source is disclosed. In one embodiment, the method includes: (1) locating an audio source based on multimodal sensor data from at least two different types of sensors and (2) automatically directing a camera to view the audio source.

In yet another aspect, a video conferencing terminal is provided. In one embodiment, the video conferencing terminal includes: (1) a camera configured to capture images within a field of view and (2) an audio source locator and tracker configured to locate an audio source based on multimodal sensor data from at least two different types of sensors and automatically direct the camera to view the audio source.

BRIEF DESCRIPTION

Reference is now made to the following descriptions of embodiments, provided as examples only, taken in conjunction with the accompanying drawings, in which.

DETAILED DESCRIPTION

Figure 1:
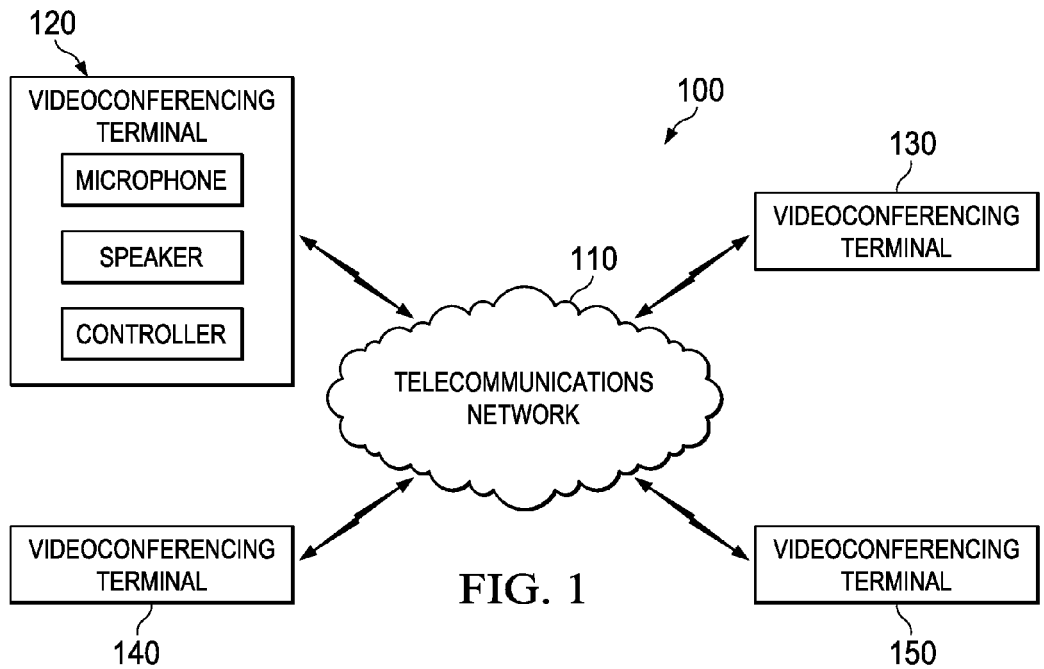
FIG. 1 is a schematic block diagram of an embodiment of a videoconferencing infrastructure within which a videoconferencing terminal constructed according to the principles of the disclosure may operate.

The disclosure provides a locating and tracking scheme that employs sensor data from multiple types of sensors (i.e., multimodal sensor data) to locate and track audio sources. The disclosure provides an apparatus for locating and tracking a single or multiple audio sources and directing a camera to capture an images, or images, of the located and tracked audio source. Locating an audio source enables pointing a camera thereat even when there may be multiple audio sources in vicinity. Tracking an audio source enables directing the camera to follow the audio source as it moves.

A video conferencing terminal may employ the disclosed locating and tracking functionality. Accordingly, the audio source to locate and track may be a participant of a video conference who is speaking. In a video-conferencing scenario where there are multiple persons in a meeting room, detecting the participant speaking and targeting the camera on that participant so that a remote location receives the image of the active speaker can be a challenge. A video conferencing terminal with the locating and tracking functionality as disclosed herein allows a person at a remote location from the camera to be able to view the participant who is speaking without the remote person manually steering the camera to stay on the speaker.

As such, a video conference terminal disclosed herein may include speaker localization that allows pointing a camera at the speaker even when there are multiple persons seated around a meeting table. Additionally, the video conferencing terminal may include speaker tracking that allows following the speaker who is not static but is moving around. An example of this case would be when the speaker gets up and starts walking towards a whiteboard.

The locating and tracking functionality disclosed herein may combine audio, video and other sensors, such as thermal and ultrasonic sensors, to locate and track an audio source. In contrast, speaker localization schemes that only use audio (sound source localization) to locate speakers may be prone to errors from background noises and may fail when there are multiple simultaneous speakers. Thus, the disclosure combines sensor data, such as sound source localization with thermal and ultrasonic measurements, to increase accuracy when pointing a camera. The combination of the various types of sensors provides sensor data fusion which is an algorithmic combination of multimodal sensor inputs, i.e., combining data from not just multiples of sensors but also different types of sensors. The combination of the thermal and ultrasonic sensors enables the detection of a person even when the person is not speaking. This is advantageous over audio-only methods (cannot detect when a person is quiet) and video methods such as face detection (where there can be detection failure due to occlusions or rotation of a target face away from the camera). The sensors that are employed may be mounted with a locating and tracking apparatus, such as a video conferencing terminal. In addition, information from other sensors mounted on the walls, ceiling or furniture may be used for sensor data fusion.

Figure 2:
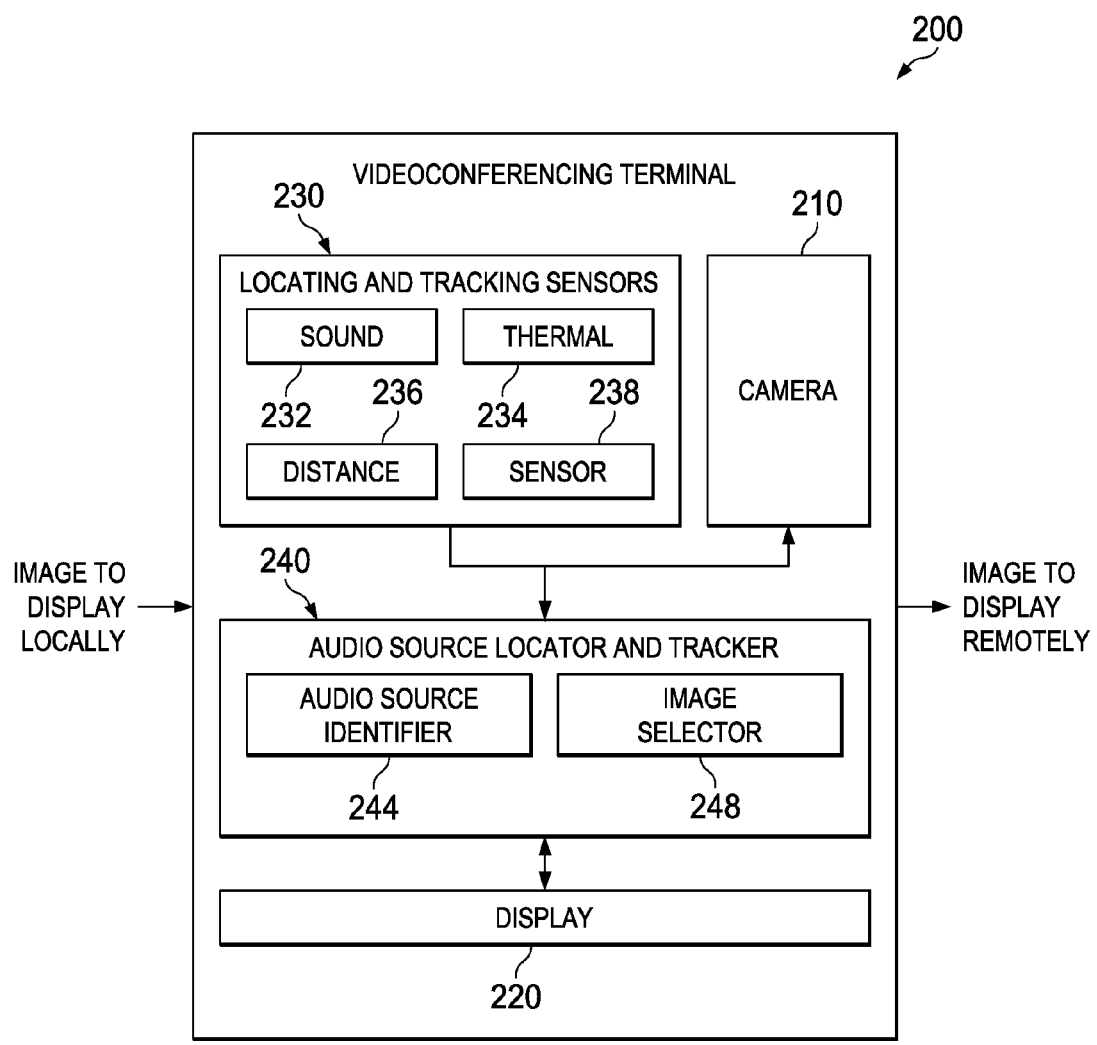
FIG. 2 illustrates a block diagram of an embodiment of a video conferencing terminal 200 constructed according to the principles of the disclosure.

FIG. 1 is a schematic block diagram of an embodiment of a videoconferencing infrastructure 100 within which a videoconferencing terminal constructed according to the principles of the disclosure may operate. This embodiment of the videoconferencing infrastructure 100 is centered about a telecommunications network 110 that is employed to interconnect two or more videoconferencing terminals 120, 130, 140, 150 for communication of video signals or information, and perhaps also audio signals or information, therebetween. An alternative embodiment of the videoconferencing infrastructure 100 is centered about a computer network, such as the Internet. Still another embodiment of the videoconferencing infrastructure 100 involves a direct connection between two videoconferencing terminals, e.g., connection of the videoconferencing terminals 120, 130 via a plain old telephone (POTS) network. Additionally, a direct connection via a network connection is yet another option of connection. As represented in the videoconferencing terminal 120, the videoconferencing terminals 120, 130, 140, 150, may include components typically included in a conventional videoconferencing terminal, such as, a microphone, a speaker and a controller. The controller may be a type of processor with an associated memory that includes a series of operating instructions that direct the operation of the controller when initiated thereby. In some embodiments, the controller may include an audio source locator and tracker as disclosed herein. The microphone can be configured to generate an audio signal based on acoustic energy received thereby, and the speaker can be configured to generate acoustic energy based on an audio signal received thereby. At least one of the videoconferencing terminals 120, 130, 140, 150, may be, for example, a cell phone, a personal digital assistant, a laptop or a desktop computer. At least one of the videoconferencing terminals, e.g., video conferencing terminal 130 includes locating and tracking functionality as disclosed herein. FIG. 2 provides an embodiment of such a video conferencing terminal.

FIG. 2 illustrates a block diagram of an embodiment of a video conferencing terminal 200 constructed according to the principles of the disclosure. The video conferencing terminal 200 includes a camera 210, a display 220, locating and tracking sensors 230 and an audio source locator and tracker 240. One skilled in the art will understand that the video conferencing terminal 200 may also include additional components that may be included in conventional video conferencing terminals, such as a speaker. For example, the video conferencing terminal 200 may include a controller that is configured to direct the overall operation thereof.

Figure 5:
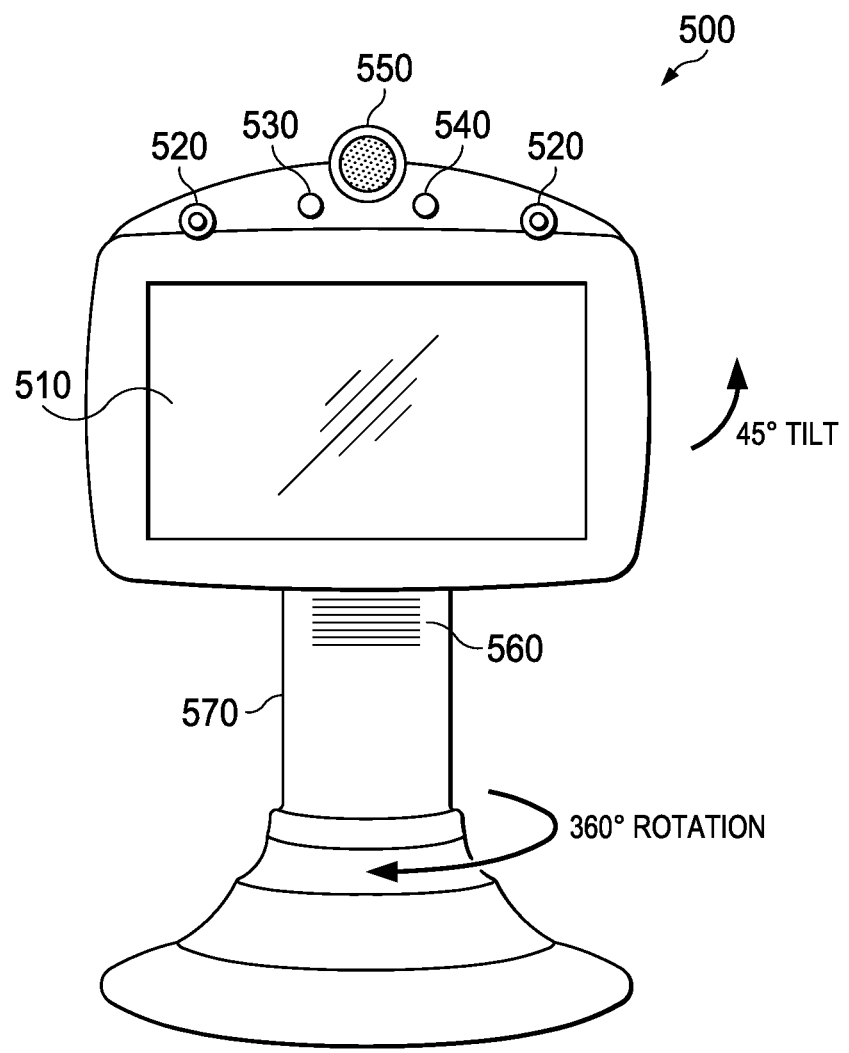
FIG. 5 illustrates a diagram of an embodiment of a video conferencing terminal constructed according to the principles of the disclosure.

In one embodiment, the video conferencing terminal 200 may be implemented as a single device, such as illustrated in FIG. 5. In another embodiment, the video conferencing terminal 200 may have a distributed architecture wherein each component may not be included within a single structure. For example, the camera 210, the display 220 or the locating and tracking sensors 230 may not be physically located within a single device but may be dispersed in a room and coupled to the audio source locator and tracker 240 via hardwire or wireless connections. In one embodiment, a portion of the video conferencing terminal 200 may be implemented as a cellular telephone. For example, a video camera of a cell telephone or a processor of a cell telephone may be employed as a camera and an audio source locator and tracker.

The camera 210 is configured to capture images. The camera 210 may be a video camera, such as a webcam. Additionally, the camera 210 can be used for locating and tracking audio sources such as, for example, individuals who are speaking during a video conference. Accordingly, the camera 210 has pan, tilt and zoom capabilities that allow the camera 210 to dynamically capture images of located and tracked audio sources. The camera 210 may include pan and tilt servos to view a located and tracked audio source. To view an audio source, the camera 210 is manipulated so that a field of view thereof includes the audio source. In some embodiments, the video conferencing terminal 200 itself may move to allow the camera 210 to view a located or tracked audio source. Accordingly, the video conferencing terminal 200 may include pan and tilt servos that move the video conferencing terminal 200 to view an audio source. As such, the pan and tilt servos may be located in a base of the camera 210 or in a base of the video conferencing terminal 200. In addition to pan and tilt capability, the camera 210 may include the ability to zoom-in and zoom-out.

The display 220 may be a conventional display, such as a flat panel display, that presents a view based on input data. In one embodiment, the display 220 may be a liquid crystal display (LCD). The display 220 is coupled to the audio source locator and tracker 240. Conventional audio-video cable may be used to couple the devices together. Wireless connections may also be employed. In some embodiments, the display 220 may be a stand-alone, projector display.

The locating and tracking sensors 230 include multiple types of sensors for locating and tracking an audio source. The various types of sensors are used to provide multimodal sensor data for audio source locating and tracking. The locating and tracking sensors 230 may include a sound sensor 232, a thermal sensor 234 and a distance sensor 236. The locating and tracking sensors 230 may include an additional sensor or sensors as represented by the component 238.

The sound sensor 232 may be a microphone or multiple microphones that are configured to generate an audio signal based on acoustic energy received thereby. As such, the sound sensor 232 may be used to locate the audio source based on audio. In some embodiments, an array of microphones may be used. In one embodiment, stereo microphones may be used.

The thermal sensor 234 is configured to detect an audio source based on temperature. In one embodiment, the thermal sensor 234 may measure the average temperature sensed in a cone of a given angle. The cone may be in a range between about 10 degrees to about 35 degrees. The average temperature may be obtained as a background temperature of a location, such as room, without a person. The average temperature can then be used as a reference. When a person steps into the purview (i.e., the cone) of the thermal sensor 234, such as a speaker during a video conference, the temperature measured would be higher than the background temperature. The distance of the person from the thermal sensor 234 can be determined depending on the measured temperature including the person. The distance may be determined based on a corresponding range of expected temperature values. The corresponding ranges may be stored in a memory associated with a controller of the video conferencing terminal 200. In one embodiment, the thermal sensor 234 may be a conventional thermal sensor.

The thermal sensor 234 may include multiple thermal sensors or thermal detecting devices. In one embodiment, the thermal sensor 234 may include an array of thermal sensing devices. The multiple thermal sensing devices may be distributed around a rotating portion of the videoconferencing terminal 200. As such, a map of a room can be provided with a scan of a smaller angular range for the video conferencing terminal 200.

The distance sensor 236 obtains and provides data on the distance of objects from the distance sensor 236. As such, the distance sensor 236 may be a conventional range finder. Accordingly, the distance sensor 236 may also be configured to detect movement towards and away therefrom. In one embodiment, the distance sensor 236 may be an ultrasonic range finder. An ultrasonic range finder, which may have up to 1-inch accuracy, can be used. Other types of range finders in addition to an acoustic range finder, such as an optical or radar based range finder, may also be used.

The distance sensor 236 may also include multiple distance sensing devices such as range finders. In one embodiment, the distance sensor 236 may include an array of distance sensing device. The multiple distance sensing devices may be distributed around the rotating portion of the videoconferencing terminal 200 to allow mapping of a room employing a smaller angular scan. Thus, compared to having just a single sensor, the videoconferencing terminal 200 would not have to make a larger scan of the room (e.g., 360 degrees) to obtain a map of the people in the room.

The additional sensor 238 may be yet another type of sensor used to collect data for locating and tracking an audio source. The additional sensor 238 may be a video-based sensor that is used to detect movement of an audio source. As such, the additional sensor 238 may be a motion detector in one embodiment. In other embodiments, the additional sensor 238 may be another type of sensor (e.g., another type of conventional sensor) that may be employed to collect and provide data for locating and tracking an audio source.

The audio source locator and tracker 240 is configured to locate and track an audio source and direct the camera 220 to view the located and tracked audio source. The audio source locator and tracker 240 performs the locating and tracking based on multimodal sensor data received from multiple types of sensors. The audio source locator and tracker 240 may be embodied as a processor with an associated memory that includes a series of operating instructions that direct the operation of the processor when initiated thereby. In some embodiments, the audio source locator and tracker 240 may be implemented as dedicated hardware or a combination of dedicated hardware and software. When embodied as a processor, the functions of the audio source locator and tracker 240 may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. In one embodiment, the audio source locator and tracker 240 may be implemented as part of the controller of the video conferencing terminal 200.

Figure 3A:
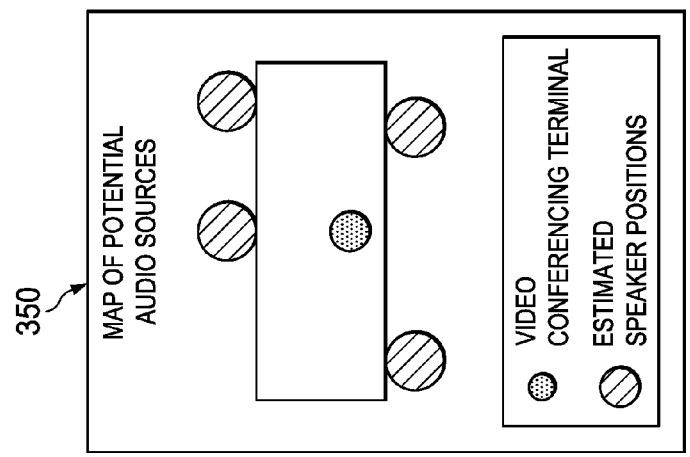
FIG. 3A illustrates a map representing potential audio sources (i.e., the participants) of the environment in FIG. 3.

The audio source locator and tracker 240 includes an audio source identifier 244 and an image selector 248. The audio source identifier 244 is configured to locate an audio source based on multimodal sensor data from the locating and tracking sensors 230. The image selector 248 is configured to automatically direct the camera 210 to view the audio source. In some embodiments, the audio source identifier 244 is further configured to locate potential audio sources based on at least some of the multimodal sensor data. The image selector 248 may also be configured to generate a map of the potential audio sources. The location of the potential audio sources may be mapped with respect to a location of the camera 210, the locating and tracking sensors 230 or the video conferencing terminal 200 itself. In one embodiment, the map may be pre-determined before locating the audio source. In other embodiments, the map may be dynamically determined when locating the audio source. FIG. 3A includes an example of a map that may be generated.

Figure 3:
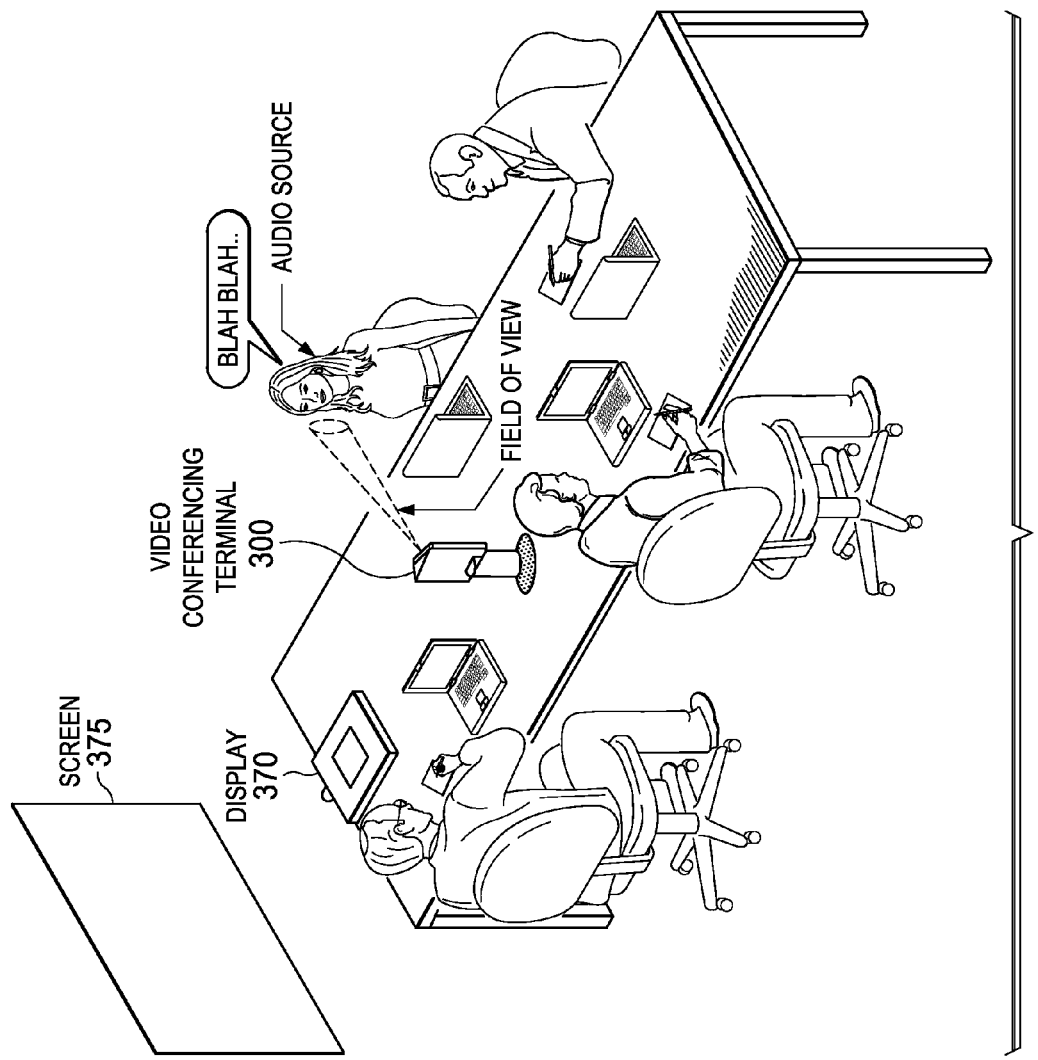
FIG. 3 illustrates an environment where an embodiment of a video conferencing terminal constructed according to the principles of the disclosure may be employed.

FIG. 3 illustrates an environment where an embodiment of a video conferencing terminal 300 constructed according to the principles of the disclosure may be employed. The representative environment is a conference room with participants sitting around a conference table. FIG. 3A illustrates a map 350 representing potential audio sources (i.e., the participants) of the environment in FIG. 3.

The video conferencing terminal 300 can generate the map 350 before a video conference even begins. With use of mechanical motion, an initial scan of the conference room may be performed to pre-determine the proximate locations of participants in the room. Knowing the proximate locations of the participants can assist the video conferencing terminal 300 in making intelligent decisions about the location of actual audio sources during a video conference.

The video conferencing terminal 300 may make an initial scan of the room and infer from thermal and distance information where the participants are located relative to a position of the video conferencing terminal 300. In some embodiments, the scan may be 360 degrees. In other embodiments, the scan may be less than 360 degrees, such as when the videoconferencing terminal 300 has multiple of the same type of sensors. In another embodiment, the video conferencing terminal 300 may determine the positions of the participants as a video conference progresses using the directions (e.g., a radial angle with respect to a "home" position of the video conferencing terminal 300) where speech and participants are detected. Both these methods allow the video conferencing terminal 300 to form and maintain a map of the participants in the room as illustrated by the map 350.

The video conferencing terminal 300 includes an audio source locator and tracker. Additionally, the video conferencing terminal 300 may include a camera, various types of sensors, and a display. A field of view for a camera of the video conferencing terminal 300 is denoted in FIG. 3 and is directed to an audio source. In one embodiment, the video conferencing terminal 300 may be the video conferencing terminal 200 of FIG. 2. In some embodiments, the map 350 may be generated by a video conferencing terminal such as illustrated in FIG. 5. In another embodiment, the video conferencing terminal 300 may be utilized as a target acquisition device that includes multiple sensors on a moving platform. In this embodiment, the video conferencing terminal 300 may not include a display. For example, a projector 370 may be used with a screen 375 for video conferencing sessions.

Figure 4:
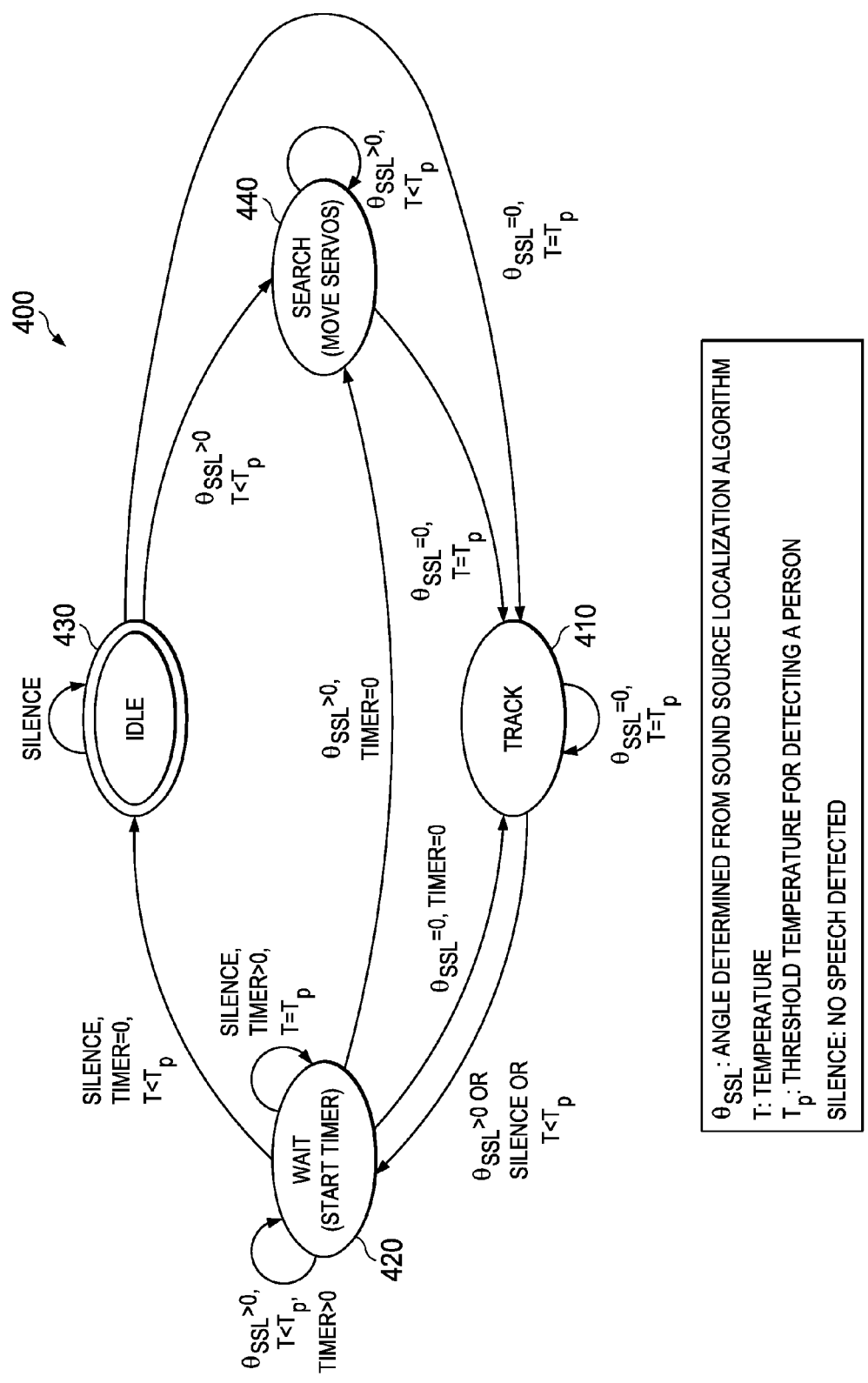
FIG. 4 illustrates a state diagram representing the operation of an audio source locator and tracker constructed according to the principles of the disclosure.

FIG. 4 illustrates a state diagram 400 representing the operation of an audio source locator and tracker constructed according to the principles of the disclosure. The state diagram 400 represents tracking of a located audio source based on measured temperatures and speech detection. A thermal sensor and a sound sensor, such as the thermal sensor 220 and the sound sensor 210 of FIG. 2, may be used to detect the temperatures and speech. A audio source locator and tracker, such as the audio source locator and tracker 240 of FIG. 2, may be configured to perform tracking according to the state diagram 400. The state diagram 400 illustrates four different states, a track state 410, a wait state 420, an idle state 430 and a search state 440. Each of these states is determined based on an angle $\theta_{SSL}$, temperature T and $T_P$ and the presence of speech. The angle $\theta_{SSL}$ may be determined from a sound source localization algorithm with inputs from a sound sensor. The temperatures T and $T_P$ may be determined by a thermal sensor and the speech may be detected by a sound sensor. The temperature T represents a measured temperature and the temperature $T_P$ represents a threshold temperature for detecting a person. The temperature $T_P$ may be established as a background temperature.

The track state 410 is maintained when the angle $\theta_{SSL}$ is zero and the temperature T is equal to the threshold temperature $T_P$. Accordingly, tracking a located audio source can be performed without detecting speech. If the angle $\theta_{SSL}$ is greater than zero, or there is silence (i.e., no speech detected) or the measured temperature T is less than the threshold temperature $T_P$, then the wait state 420 is entered. At the wait state 420, a timer is initiated. The timer may be set based on experience. Different times may be established for the timer based on desired sensitivity levels or based on different locations. The timer may be set during manufacturing or may be set by an end user employing a user interface. A display may provide a user interface to set the timer.

The wait state 420 is maintained as long as the angle $\theta_{SSL}$ is greater than zero, the measured temperature T is less than the threshold temperature $T_P$ and the timer is greater than zero. Additionally, the wait state is maintained when there is silence, the timer is greater than zero and the measured temperature T is equal to the threshold temperature $T_P$.

From the wait state 420, all of the other states may be entered depending on the status of the various conditions. If there is silence, the timer equals zero and the measured temperature T is less than the threshold temperature $T_P$, then the idle state 430 is entered from the wait state 420. Upon reaching the idle state 430, the video conferencing terminal can move to either the search state 440 or the track state 410 depending on the angle $\theta_{SSL}$ and the measured temperature T. If the angle $\theta_{SSL}$ is greater than zero and the measured temperature T is less than the threshold temperature $T_P$, then the search state 440 is entered. If the angle $\theta_{SSL}$ is equal to zero and the measured temperature T is equal to the threshold temperature $T_P$, then the track state 410 is entered. Thus, even if speech is not detected, the video conferencing terminal may move from the idle state 430.

If the timer is equal to zero and the angle $\theta_{SSL}$ is equal to zero, then the video conferencing terminal moves from the wait state 420 to the track state 410. Additionally, if the timer is equal to zero and the angle $\theta_{SSL}$ is greater than zero, then the video conferencing terminal moves from the wait state 420 to the search state 440. The search state 440 is maintained when the angle $\theta_{SSL}$ is greater than zero and the measured temperature T is less than the threshold temperature $T_P$. When the angle $\theta_{SSL}$ is equal to zero and the measured temperature T is equal to the threshold temperature $T_P$, then the track state 410 is entered from the search state 440. At the search state 440, servos are activated to move the sensors locate an audio source.

FIG. 5 illustrates a diagram of an embodiment of a video conferencing terminal 500 constructed according to the principles of the disclosure. The video conferencing terminal 500 may be used in a room for video conferencing. In one embodiment, the video conferencing terminal 500 may be sized to place on a table for video conferencing. As such, the various sensors may be positioned on the video conferencing terminal 500 to proximately coincide with the heads of participants of the video conference at the table. The video conferencing terminal 500 includes a display 510, microphones 520, a thermal sensor 530, a range finder 540, a camera 550, a speaker 560 and a base 570. As noted with respect to FIG. 2, multiple sensors of each type may be distributed across the video conferencing terminal 500 in some embodiments to allow mapping a room using a smaller scan angle. The video conferencing terminal 500 also includes a coupling interface (not illustrated) configured to provide terminations for various cables, conductors, power cords, etc. The coupling interface may be configured to allow coupling to a communications network and a power source. In one embodiment, the coupling interface may allow wireless connections. The interface may be a conventional interface.

The display 510 may be a conventional display that is configured to provide images for viewing. The display 510 may provide images from a remote location for the video conference. The display 510 may also be configured to provide a user interface. The user interface may include menus activated by touch or by a coupled keyboard, mouse, etc., via the coupling interface. The user interface may allow a user to program various settings for the video conferencing terminal 500 or adjust the picture of the display 510.

The sound sensor 520 is configured to detect sound. The sound sensor 520 includes stereo microphones. The thermal sensor 530 is used to detect heat and the range finder 540 is used to determine distance. Each of these sensors may be conventional devices. In one embodiment, the range finder 540 may be an ultrasonic sensor. These sensors provide the multimodal sensor data that is used by a audio source locator and tracker (not illustrated) of the video conferencing terminal 500 to locate and track audio sources.

The camera 550 is configured to capture images and the speaker 560 is configured to provide audio. The camera 550 and the speaker 560 may be conventional devices that are employed with video conferencing systems.

The base 570 is configured to support the components of the video conferencing terminal 500. The base 570 is configured to set on top of a table for a video conference. The base 570 includes servos to rotate and tilt the video conferencing terminal 500. As illustrated, the base 570 may rotate the video conferencing terminal 500 360 degrees and tilt the video conferencing terminal 500 45 degrees.

Figure 6:
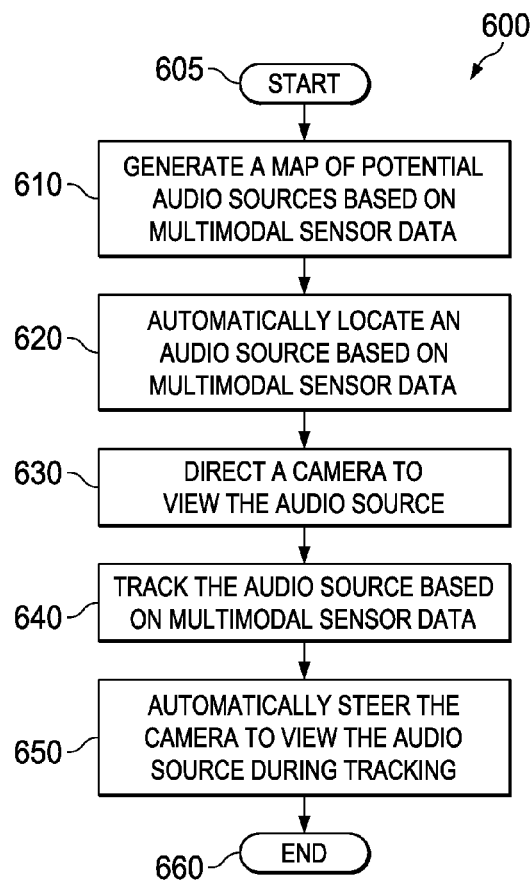
FIG. 6 illustrates a flow diagram of an embodiment of a method for directing a camera to view an audio source carried out according to the principles of the present disclosure.

FIG. 6 illustrates a flow diagram of a method 600 for directing a camera to view an audio source carried out according to the principles of the present disclosure. At least part of the method 600 may be carried out by an audio source locator and tracker. In one embodiment, a video conferencing terminal may be employed to perform the method 600. The method 600 begins in a step 605.

In a step 610, a map of potential audio sources is generated based on multimodal sensor data. The data may be provided by multiple sensors or different types of sensors. For example, a thermal sensor and a range finder may be used to provide the multimodal sensor data. The map may be generated with the potential audio sources positioned with respect to a video conferencing terminal or a camera of the video conferencing terminal.

In a step 620, an audio source is located based on multimodal sensor data from at least two different types of sensors. The map may be used to assist in locating the audio source. In addition to the thermal sensor and the range finder, a sound sensor may also be employed to provide the multimodal sensor data. In some embodiments, other types of sensors may also be used to provide multimodal sensor data.

A camera is automatically directed to view the audio source in a step 630. The camera is moved such that the audio source is within the field of view of the camera. The camera may also be directed to zoom-in or zoom-out.

In a step 640, the audio source is tracked. Multimodal sensor data may be used to track the audio source. Tracking may be performed according to the state diagram illustrated in FIG. 4. In a step 650, the camera is automatically steered to view the audio source during tracking. As such, the camera may be rotated, tilted, zoomed-in or zoomed-out. The camera can capture images of the located and tracked audio source. These captured images can be provided to a remote locate for viewing. The method 600 ends in a step 660.

A person of skill in the art would readily recognize that steps of various above-described methods, including method 600, can be performed by programmed computers. For example, an audio source locator and tracker may be employed to work with other components of a video teleconferencing terminal to perform the steps of the method 600. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Those skilled in the art to which the application relates will appreciate that other and further additions, deletions, substitutions and modifications may be made to the described embodiments. Additional embodiments may include other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

What is claimed is:

1. An apparatus, comprising:
    an audio source identifier configured to locate an audio source based on multimodal sensor data from at least two different types of sensors, wherein said at least two different types of sensors include at least one type of sensor that is not an audio sensor nor a video sensor; and
    an image selector configured to automatically direct a camera to view said audio source based on said multimodal sensor data.

2. The apparatus as recited in claim 1 further comprising said camera.

3. The apparatus as recited in claim 1 further comprising said at least two different types of sensors.

4. The apparatus as recited in claim 1 wherein said at least two different types of sensors include an audio sensor and at least one sensor selected from the group consisting of:
    a video sensor,
    a thermal sensor, and
    a range finder.

5. The apparatus as recited in claim 1 wherein said audio source identifier is further configured to locate potential audio sources based on said multimodal sensor data.

6. The apparatus as recited in claim 5 wherein said image selector is further configured to generate a map of said potential audio sources.

7. The apparatus as recited in claim 5 wherein said audio source identifier is configured to locate said potential audio sources before locating said audio source.

8. The apparatus as recited in claim 1 wherein said audio source identifier is further configured to detect movement of said audio source based on data from at least one of said at least two different types of sensors.

9. The apparatus as recited in claim 8 wherein said image selector is further configured to automatically steer said camera in response to said detected movement to track said audio source.

10. A method of directing a camera to view an audio source, comprising:
    locating an audio source based on multimodal sensor data from at least two different types of sensors, wherein said at least two different types of sensors include at least one type of sensor that is not an audio sensor nor a video sensor; and
    automatically directing a camera to view said audio source based on said multimodal sensor data.

11. The method as recited in claim 10 wherein said at least two different types of sensors include an audio sensor and at least one sensor selected from the group consisting of:
    a video sensor,
    a thermal sensor, and
    a range finder.

12. The method as recited in claim 10 further comprising locating potential audio sources based on said multimodal sensor data.

13. The method as recited in claim 12 further comprising generating a map of said potential audio sources with respect to a location of said camera.

14. The method as recited in claim 12 wherein said locating said audio source is based on said map.

15. The method as recited in claim 10 further comprising capturing an image of said audio source employing said camera.

16. The method as recited in claim 10 further comprising detecting movement of said audio source based on data from at least one of said at least two different types of sensors and automatically steering said camera in response to said detected movement to track said audio source.

17. A video conferencing terminal, comprising:
    a camera configured to capture images within a field of view; and
    an audio source locator and tracker configured to locate an audio source based on multimodal sensor data from at least two different types of sensors and automatically direct said camera to view said audio source, wherein said at least two different types of sensors include at least one type of sensor that is not an audio sensor nor a video sensor.

18. The videoconferencing terminal as recited in claim 17 further comprising said at least two different types of sensors.

19. The videoconferencing terminal as recited in claim 17 wherein said audio source locator and tracker is further configured to locate potential audio sources based on said multimodal sensor data and generate a map of said potential audio sources.

20. The videoconferencing terminal as recited in claim 17 wherein said audio source locator and tracker is further configured to track movement of said audio source based on data from at least one of said at least two different types of sensors and automatically steer said camera in response to said movement.

* * * * *